United States Patent

[11] 3,545,568

| [72] | Inventor | Gerard H. Lacoste |
| | | Saint-Maur, France |
| [21] | Appl. No. | 743,845 |
| [22] | Filed | July 10, 1968 |
| [45] | Patented | Dec. 8, 1970 |
| [73] | Assignee | Societe Herwaythorn S.A, |
| | | Paris, France |
| [32] | Priority | July 25, 1967 |
| [33] | | France |
| [31] | | No. 115,527 |

[54] MOTOR VEHICLE GEARBOXES
7 Claims, 5 Drawing Figs.
[52] U.S. Cl. .................................................. 184/6;
74/467, 184/11
[51] Int. Cl. ...................................................... F16n 7/26,
F01m 1/12
[50] Field of Search............................................ 184/11,
6(U), 6(N); 74/467, 468

[56] References Cited
UNITED STATES PATENTS
| 2,018,188 | 10/1935 | Padgett et al. ................ | 184/11 |
| 2,368,963 | 2/1945 | Boden ........................... | 184/11 |

FOREIGN PATENTS
| 590,867 | 7/1947 | Great Britain................ | 184/ |
| 416,101 | 11/1946 | Italy ............................. | 184/6U |

Primary Examiner—Manuel A. Antonakas
Attorney—Waters, Roditi, Schwartz and Nissen ABSTRACT: A motor vehicle differential gearbox in which, for the lubrication of the bearings of the transmission shaft; there are two channels separated from each other by one common partition and arranged symmetrically in respect of a substantially horizontal plane which contains the axis of the transmission shaft.

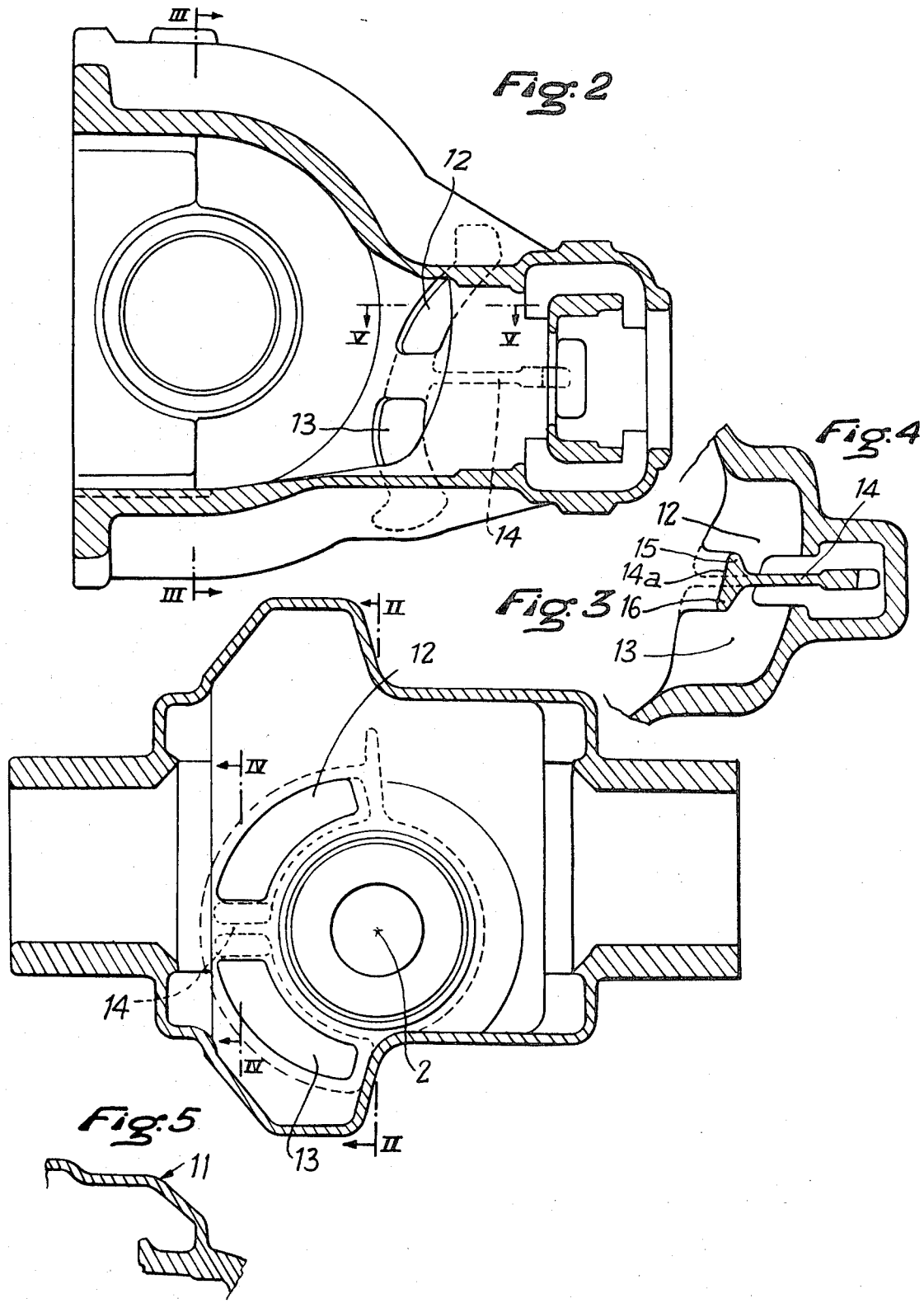

MOTOR VEHICLE GEARBOXES

BACKGROUND OF THE INVENTION

For some time past, motor vehicles have been built with driving axles for transmission of various types, in which a pinion keyed onto the end of the transmission shaft and the rim of the differential have a hypoid system of teeth. In other words, the main axis of the differential and of the toothed rim on the one hand, and the axis of the transmission shaft end of the pinion, on the other, are not concurrent. In general, the pinion is installed below the horizontal plane passing through the main axis of the axle and of the wheels.

It is also known for the end part of the transmission shaft, adjacent the pinion, to be guided in the gearcase by the aid of a first and a second bearing, at a certain distance apart. These latter may be of any suitable type; at the present time they almost exclusively consist of roller bearings capable of resisting high radial and axial loads. It is generally difficult to lubricate these bearings correctly, particularly the one farthest from the pinion. Numerous solutions have been suggested for this problem. A simple solution, known in particular through U.S. Pat. No. 20,149, is that in which the gearcase contains a pan situated in the plane of the rim of the differential. This pan is moulded as an integral part of the gearcase; it receives the oil projected by the differential rim. In the prolongation of the said pan a channel is provided to guide the oil to the bearings. This oil then returns to the base of the gearcase, which surrounds the differential.

All the known means of lubrication, including that described in the aforementioned U.S. patent, suffer from a serious drawback. Their design is such that they can only function normally when the axle on which they are mounted is itself in the position which it is normally required to occupy. In other words, if the axle is of the type in which the pinion, in the operating position, is situated below the horizontal plane passing through the main axis of the axle, the assembly of this axle cannot be reversed, which means that it cannot be placed in a position such that the pinion is situated above the said horizontal plane, for under these circumstances the lubrication of the bearings would be very insufficient, if any lubrication took place at all. The bearings would then only last for a very limited period.

Now although the driving axles are generally installed in such a way that the pinion which acts on the rim of the differential with a hypoid system of teeth is situated below the horizontal plane passing through the main axis of the axle, it is often found desirable to place this pinion above the said horizontal plane.

Under the present circumstances, either two different kinds of axles are used, of which the position can never be modified, or only one kind of axle is adopted, with a lower pinion, of which the use sometimes complicates the transmission, owing to the fact that the position selected for this axle is necessarily invariable.

SUMMARY OF THE INVENTION

The purpose of the invention is to provide a means for lubricating the two bearings of the transmission shaft which will be efficacious and simple. Furthermore, the invention aims at a means of lubrication which will be an integral part of the gearcase, without the necessity of equipping the latter with any additional parts. Finally, a further important object of the invention is to provide a driving axle which can be reversed, which means one that a transmission with a pinion with a hypoid system of teeth can be mounted either with the pinion situated above the horizontal plane passing through the main axis of the axle or with the pinion situated below the said plane, without distinction. Needless to say, this reversal at which the invention aims, as regards the assembly of the axle, necessitates no prior modification to the latter and in no way detracts from the current lubrication of the two bearings supporting the end part of the transmission shaft.

In a splash-lubricated driving axle, consisting of a gearcase enclosing a differential and containing a certain volume of oil, the wall of the gearcase delimits at least one channel of which the outlet, in the interior of the said gearcase, is substantially opposite a movable part rotating about the main axis of the differential, the said part being at least partly immersed in the oil and the channel as a whole extending longitudinally to the transmission shaft, as far as the second bearing.

The invention provides for two channels leading separately into the interior of the gearcase and combining with each other between the two bearings, front and rear; these two channels, in a preferred embodiment of the invention, consist of a hollowed-out portion partially subdivided into two channels by one common longitudinal partition, which thus separates the channels from each other.

BRIEF DESCRIPTION OF THE DRAWINGS

A description of an embodiment of the invention will now be provided, solely by way of an example, and secondary characteristics, as well as the advantages offered by the system, will emerge in the course of the said description. Reference will be made to the accompanying drawings, wherein:

FIG. 2 is a sectional diagram, along the line II–II of FIG. 3, of the gearcase cast in one piece with the axle of FIG. 1, without the mechanical devices usually contained in the said gearcase;

FIG. 3 is a sectional view, along the line III–III of the gearcase shown in FIG. 2;

FIG. 4 is a sectional view, along the line IV–IV of FIG. 3;

FIG. 5 is a sectional view, along the line V–V of FIG. 2.

DESCRIPTION OF THE PREFERRED EMBODIMENT

Figure 1:
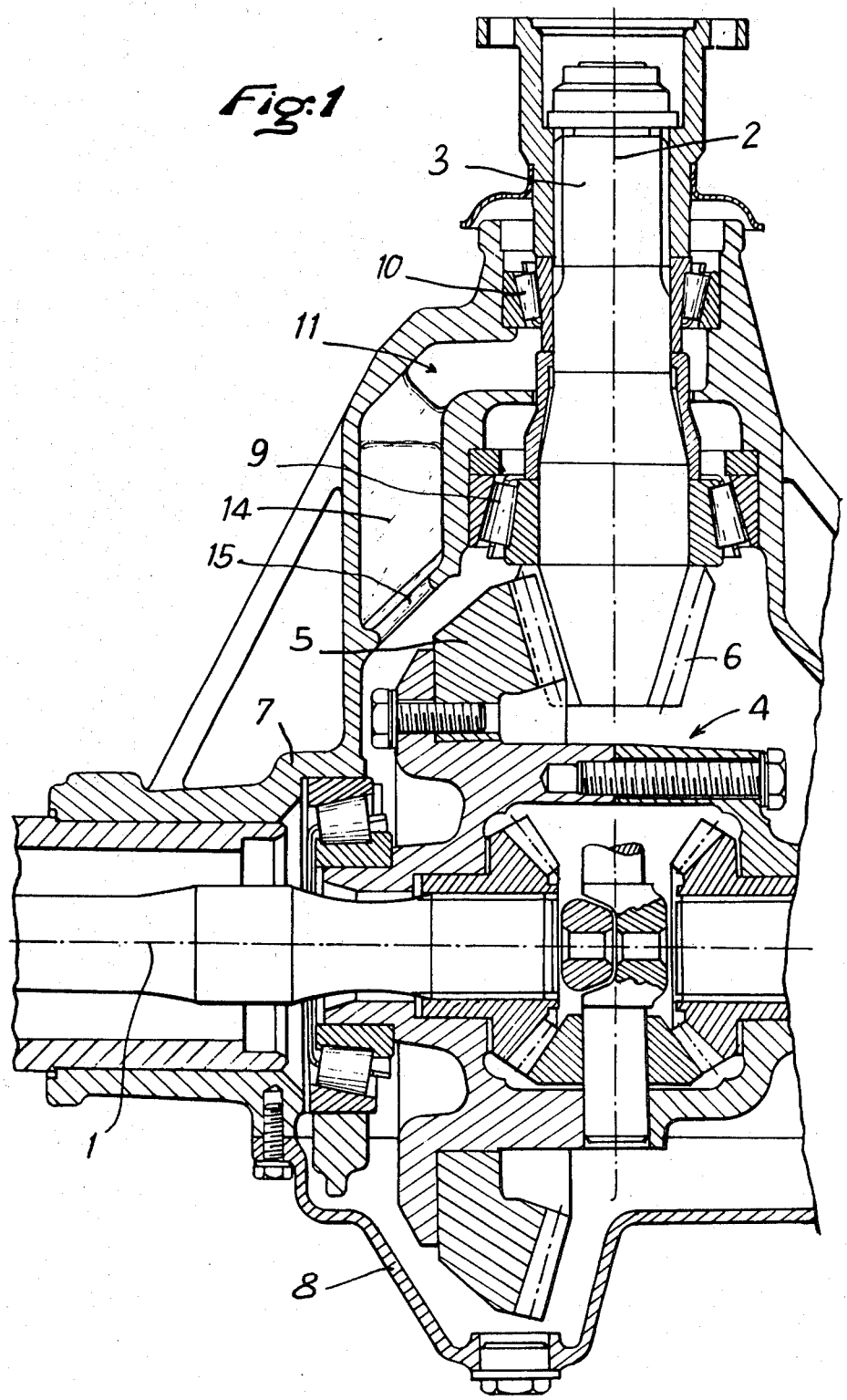
FIG. 1 is a partial view, from above, in broken section, of a driving axle in accordance with the invention.

The main components, already known in themselves and comprising a driving axle of a motor vehicle, will now be briefly enumerated, by reference to FIG. 1.

The axle shown is of the type in which the pinion acting on the rim of the differential has a hypoid system of teeth. In other words, the main axis 1 of the axle does not contact the main axis 2 of the transmission shaft 3. Contrary to the impression given by FIG. 1, which is a "broken sectional diagram," the horizontal plane containing the main axis 1 does not contain the main axis 2. This latter can pass above or below the said horizontal plane. FIG. 2 provides a measure of the displacement between the two axes 1 and 2 of the axle, on the one hand, and of the transmission shaft, on the other.

The main axis 1 of the axle is also the main axis of a conventional differential, designated by the general reference number 4, and comprising a toothed rim 5. This latter engages a driving pinion 6 keyed onto the end of the transmission shaft 3.

The entire system is enclosed in a gearcase 7, which is provided with a cover 8. The end part of the transmission shaft 3 is guided in the gearcase 7 by means of two roller bearings, one of these, 9, being adjacent the pinion 6 which acts on the rim 5, and the other, 10, being spaced from the bearing 9.

These bearings 9 and 10 consist, generally speaking, of low-friction bearings of the type suitable for the conditions of operation contemplated.

As usual, the gearcase 7 contains a certain volume of oil, in which the toothed rim 5 is partly submerged.

Substantially in the plane of rotation of the toothed rim 5, the actual wall of the gearcase 7 delimits a space subdivided into two channels 12 and 13 by one common partition 14. This internal partition 14 is cast in one piece with the gearcase unit.

FIGS. 2 to 5 show the gearcase alone, as a rough casting, without the cover 8 and without the internal mechanical devices.

It may be seen from FIG. 5 that the volume of the channels is clearly delimited externally by the actual wall of the gearcase, which in the place in question has a kind of enlargement. The channels 12 and 13 extend along the space in which transmission shaft 3 is accommodated.

The common partition 14 separates the channels 12 and 13 from each other, and these open separately (FIGS. 2, 3 and 4) inside the gearcase, communication being provided between their opposite end (FIG. 1), after an interruption of the partition 14, and a hollowed-out part 11, of a relatively small volume, situated between the two bearings 9 and 10. It may be seen that the cross section of each of the channels 12 and 13, at the place where it opens into the gearcase, is greater than its cross section at the place where it combines with the hollowed-out portion 11.

The opening of each channel in the gearcase extends over a quarter-circle, as clearly shown in FIG. 3, the partition 14 being on a level with the axis 2 of the shaft 3. To be more specific, the partition 14 and the axis 2 are substantially situated in the same plane, perpendicular to the vertical plane containing the axis 2 when the gearcase is in its position for operation.

Furthermore (see FIG. 4) the partition 14 is provided, on its part 14a, exposed inside the gearcase 7, with edges or lips, of comparatively large dimensions and extending, at 15 and 16, on both sides of the opposite faces of this partition 14. This system ensures a general symmetry for the channels 12 and 13, for their openings in the gearcase, for the partition 14 and for the lips 15 and 16, with respect to a plane passing through the axis 2 of the shaft 3 and perpendicular to the vertical plane containing the axis 2 when the gearcase is in its position for operation.

The toothed rim 5 may be regarded as an element submerged in the oil of the gearcase and rotatable around the axis 1 of the differential. During operation this element, which in the present example is the rim itself, projects oil through the inlet of the channels 12 and 13. Owing to the existence of the partition 14 and of the edges or lips 15 and 16, that one of the two channels which is situated above the other conveys the oil in the direction of the hollowed-out part 11 and of the bearings 9 and 10, while the channel below the other guides this oil, on its return, to the interior of the gearcase. As the cross section at the inlet of each channel is greater than in the vicinity of the bearings, a constriction occurs in the vicinity of these bearings, reliably ensuring their lubrication. Similarly, each edge, 15 or 16, of the upper channel, 12 or 13, forces the oil towards the bearings instead of allowing it to fall directly into the gearcase.

The fact is that in the embodiment shown in FIG. 1, the second bearing 10, farther from the interior of the gearcase, is in more direct communication with the hollowed-out part 11, as may be seen from FIG. 1, then the bearing 9, which can directly receive the oil projected by the rim 5. An internal partition situated in the hollowed-out part, in the vicinity of the bearing 9, causes the oil to move to a greater extend towards the bearing 10. It will be noted that the oil circulation which comes about in the channels 12 and 13 is independent of the position of the gearcase 7. When the latter is arranged as shown in FIG. 2, or in the reverse direction, i.e. if the diagram is reversed, with the position for the transmission shaft 3 higher up than the axis 1 of the axle, the same result is obtained. The fact is that the oil projected by the rim 5 into the channels 12 and 13 invariably creates a flow of oil proceeding through the upper channel towards the bearings and returning through the lower channel to the gearcase.

Due to the symmetry of the channels, in accordance with the invention, an axle such as that described can be mounted either in one direction or in the other, without distinction, and without any conversion operations, and with the same simple and effective lubricating action for the bearings, particularly of the second bearing of the transmission shaft.

It is obvious that the channels could be installed in a different position and that use could be made, for the projection of the oil thereto, of a rotor rotating with one of the parts of the differential or with a part, such as an axle, driven by the differential. However, the use of the differential rim itself is more advantageous.

It is also obvious that a different general form could be adopted for the hollowed-out part 11 and the channels 12 and 13. The invention is thus not limited to the embodiment described and illustrated but covers any alternative not at variance with its principles or beyond its scope. In particular, although the above description relates to an axle with a pinion and rim with a hypoid system of teeth, it is naturally possible to apply the invention to a transmission axle of a completely different type, if it is considered advantageous for this axle to be capable of being mounted in either one direction or the other according to circumstances.

I claim:

1. A drive shaft assembly for an automotive vehicle, said assembly comprising a casing, a differential accommodated inside the casing, two bearings, means supporting the two bearings in spaced relationship in the casing, a drive shaft supported by the bearings in the casing, a drive pinion keyed to the shaft at the inner end thereof and meshing with said differential, a lubricant supply in said casing, a substantially horizontal partition in said casing arranged so that two channels are positioned in the casing on either side of said partition, said two channels extending between the bearings, said channels being substantially symmetrical with respect to a horizontal plane passing through said partition so that the channels can be positioned at will above or below one another by inverting the casing thereby to function respectively and alternately as a supply channel or a discharge channel for passage of lubricant in said casing between said bearings.

2. A drive shaft assembly as claimed in claim 1 wherein said partition is positioned substantially in a plane passing through the axis of the drive shaft and perpendicular to the vertical plane of symmetry of the shaft.

3. A drive shaft assembly as claimed in claim 2 wherein said channels have openings inside the casing which are substantially symmetrical with respect to the plane of the partition.

4. A drive shaft assembly as claimed in claim 3 wherein said partition includes lips at its end adjacent the openings of the channels extending to either side of the partition.

5. A drive shaft assembly as claimed in claim 3 wherein said openings of the channels inside the casing are each of circular configuration covering substantially a quarter-circle and are arranged symmetrically with respect to a substantially horizontal plane.

6. A drive shaft assembly as claimed in claim 5 wherein said partition is integral with said casing.

7. A drive shaft assembly as claimed in claim 1 comprising an axle driven by said drive shaft via said differential, said axle having an axis which is vertically offset from the axis of said drive shaft, said drive pinion being adjacent said channels.